R. MARTINI.
DEVICE FOR RECEIVING AND COLLECTING MAIL.
APPLICATION FILED JAN. 17, 1910.

975,552.

Patented Nov. 15, 1910.
6 SHEETS—SHEET 3.

Witnesses:
Edgar T. Farmer
G. A. Pennington

Inventor:
Rudolph Martini
By Cassitt Davis
attys.

R. MARTINI.
DEVICE FOR RECEIVING AND COLLECTING MAIL.
APPLICATION FILED JAN. 17, 1910.

975,552.

Patented Nov. 15, 1910.

Witnesses:
Edgar T. Farmer.
G. A. Pennington.

Inventor:
Rudolph Martini,
By Cannot & Co.
Attys.

R. MARTINI.
DEVICE FOR RECEIVING AND COLLECTING MAIL.
APPLICATION FILED JAN. 17, 1910.

975,552.

Patented Nov. 15, 1910.
6 SHEETS—SHEET 6.

Witnesses:
Edgar T. Farmer
G. A. Pennington

Inventor:
Rudolph Martini,
By
attys

UNITED STATES PATENT OFFICE.

RUDOLPH MARTINI, OF ST. LOUIS, MISSOURI.

DEVICE FOR RECEIVING AND COLLECTING MAIL.

975,552.

Specification of Letters Patent. Patented Nov. 15, 1910.

Application filed January 17, 1910. Serial No. 538,493.

*To all whom it may concern:*

Be it known that I, RUDOLPH MARTINI, a subject of the Emperor of Austria-Hungary, and a resident of the city of St. Louis and State of Missouri, have invented certain new and useful Improvements in Devices for Receiving and Collecting Mail, of which the following is a specification.

This invention relates to devices for receiving and collecting mail and more particularly to letter-boxes of the kind that are automatically opened when a collecting-bag is attached thereto.

The objects of this invention are to facilitate the collection of the mail, to render it unnecessary for the collector to handle the pieces, to protect the same from the elements, to improve generally upon the construction and arrangement of such devices, and to attain certain advantages hereinafter more fully appearing.

The invention consists in the parts and in the arrangements and combinations of parts hereinafter described and claimed.

In the accompanying drawings, which form part of this specification and wherein like symbols refer to like parts wherever they occur.

The letter box 1 is provided with a slot 2 in the end wall or walls through which the letters are deposited into the box. The bottom of the box 1 comprises two outwardly-opening hinged doors 3, 4, respectively, which are connected so as to open and close simultaneously. As shown in the drawings, the connection between the two doors comprises an elongated lug or arm 5 which projects from the inner face of the door 3 and a curved link or bar 6 which is pivotally secured at one end to said lug 5 and at its opposite end to a short lug or projection 7 on the inner face of the door 4. A spring 8 has its middle portion coiled about a stud 9 on the arm or projection 5 and has one of its end portions, 10, hooked and slidably engaged under the link 6 while its opposite end portion, 11, bears against the inner face of the door 3. By this arrangement, the spring 8, being normally under compression, tends to force the doors open.

To hold the doors 3, 4, normally closed, the same are each provided on their inner faces, near their ends, with lugs or keepers 12 which have holes 13 therein. These perforated members 12 are arranged to engage hooked members 14 which are mounted upon or formed as a part of rocking members 15. One of these rocking members 15 is mounted at each end of the box and each member has a pair of the hooked members 14 thereon, one for each of the doors 3, 4. The members 15 are preferably mounted on lugs or ears 16 formed or secured on the inner faces of the end members of a rectangular frame 17 which is secured inside of or forms part of the bottom portions of the side and end walls of the box 1.

A hollow bead or molding 18 is secured around the front and side bottom edge portions of the box. This molding is provided with an inturned bottom flange 19 whereby the space between the bead and rectangular frame 17 or bottom edge portions of the walls is practically closed. On each of the rocking members 15 is formed or mounted a lever extension 20. This extension 20 hangs downwardly from the member 15 and its lower portion is offset and passed through a slot in the end member of the frame 17 so as to overhang the flange 19 on the end portion of the bead 18. The bottom end of this lever 20 is arranged in the path of a cam-projection 21 on the side member 22 of the frame of a collecting-bag 23. The side members 22 of the frame of the collecting-bag are preferably of angle-iron section; that is, they each comprise vertical portions and horizontal top flange portions. Two slots 24 are cut in the lower portion of the front bead or molding 18 to receive the angular side members of the bag-frame so that it may be attached to the letter box. The top flange portions of the side members 22 of the bag-frame are supported by the inturned flange portions 19 of the end molding 18 and the vertical portions of said side members slide through spaces which are left between the end edges of the doors 3, 4, and the edges of the flanges 19. As the cam-projections 21 on the side members of the frame are moved under the ends of the lever extensions 20, the rocking members 15 are rocked and the hooked members 14 thereon are moved out of engagement with the lugs 12 of the doors 3, 4, whereupon the spring 8 acts to open said doors.

To prevent the lock from being released without the use of a proper key, a controlling device is provided which coöperates with the lever extension 20 so that the same cannot be actuated by the cam-projection 21 until said controlling device is actuated by a key portion provided on the side bar 22 of the bag-frame. As shown in the drawings, the controlling device comprises a sliding plate 25 which is mounted on the outer face of the end member of the frame 17. This plate 25 preferably has a longitudinal slot 26 therein which fits over a pin or stud 27 on the end member of the frame 17; and said plate also has a longitudinal bore in its rear portion which slidably fits a horizontal pin 28 projecting from the back wall of the box. A coil spring 29 slides on this pin between the back wall and the rear end of the plate 25 whereby said plate is yieldingly held in forward position with its projecting portion 30 overhanging the shoulder 31 formed on the lever member 20 at the top of the offset portion thereof.

The plate 25 is provided with a depending hook 32 which is in the path of a shoulder 33 formed on the side member 22 of the bag-frame. A horizontal flange or shelf 34 is provided on the outer face of the end member of the frame 17 above the top edge of the sliding plate 25' so as to resist upward thrust upon the plate. This flange 34 is provided with a notch which is adapted to receive the end of a bolt 35 which is slidably mounted in a vertical groove in the outer face of the sliding plate 25. The notch in the flange 34 is arranged so that the bolt 35 may enter it when the sliding plate 25 is in its forward position. The bolt 35 is provided at its lower end with a lateral pin or projection which fits into a cam-slot 36 formed for the purpose in a sliding plate 37. This sliding plate 37 is placed against the outer face of the plate 25 and is slidably supported between two notched ribs 38, 39, on the inner side of the end bead 18. This plate 37 is yieldingly held in normal or forward position by a spring 40 which is connected at one end to a stud 41 on the inner face of the end bead 18 and at its opposite end to a stud 42 on the outer face of said plate 37. The plate 37 is provided with a depending hook 43 similar to the hook 32 on the plate 25; and, normally, the two hooks lie side by side.

Figure 1:
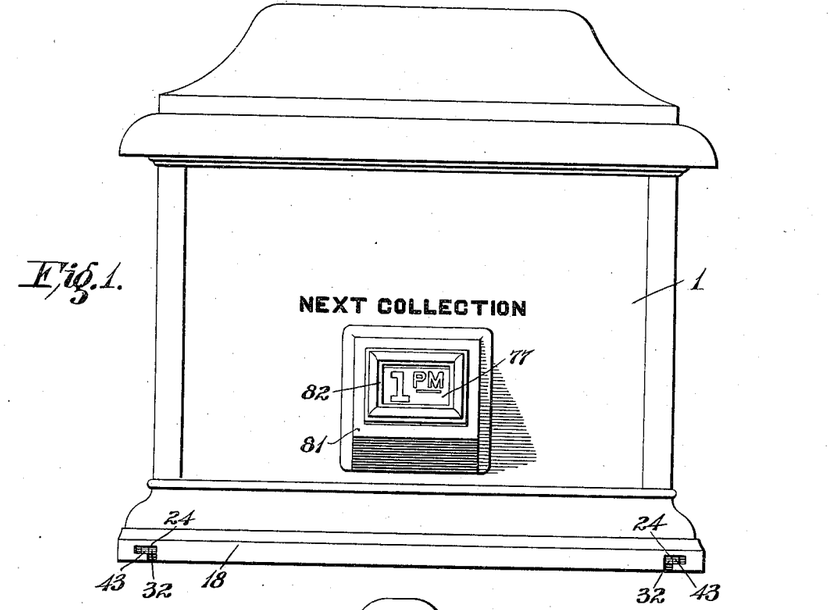
Figure 1 is a front elevation of a letter-box embodying my invention.
Figure 2:
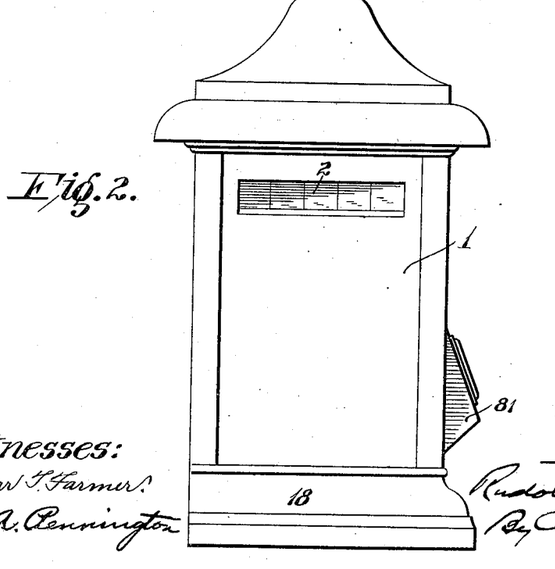
Fig. 2 is a side elevation of the letter-box.
Figure 3:
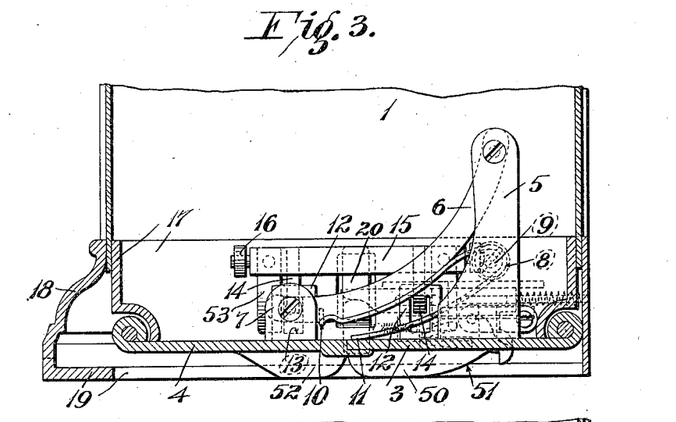
Fig. 3 is a fragmentary transverse vertical section taken through the bottom portion of the box, showing the doors closed.
Figure 4:
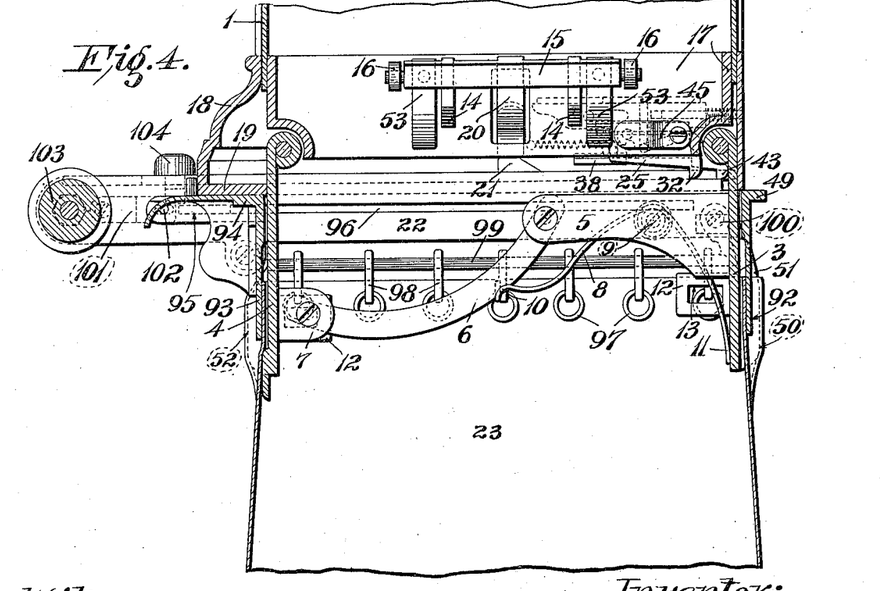
Fig. 4 is a view similar to Fig. 3 showing the frame of the collecting-bag attached to the box and the doors opened.
Figure 5:
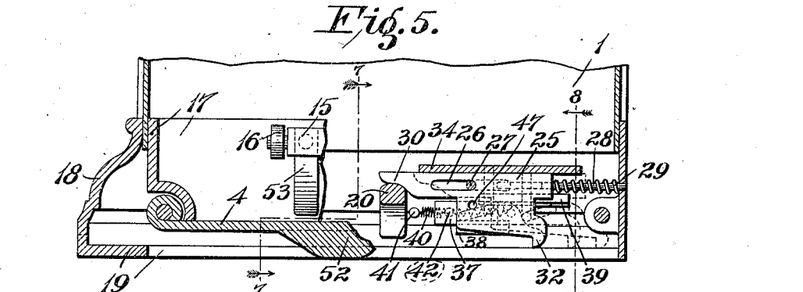
Fig. 5 is a fragmentary transverse vertical section showing the controlling members for the door-retaining lock in normal position.
Figure 6:
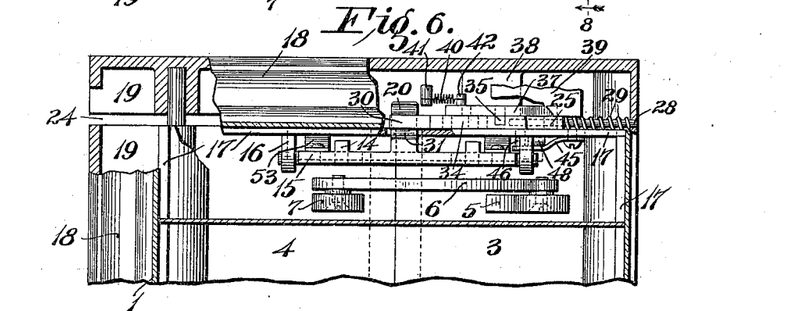
Fig. 6 is a fragmentary horizontal section through the lower end portion of the box, showing the coöperating door-locking device in normal position.
Figure 7:
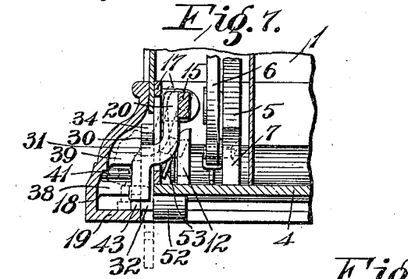
Fig. 7 is a fragmentary longitudinal vertical section on the line 7—7 of Fig. 5.
Figure 8:
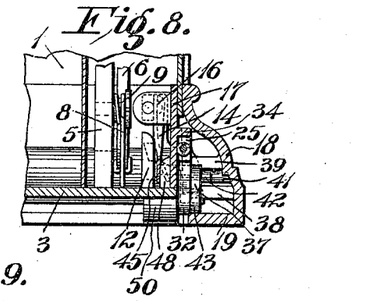
Fig. 8 is a fragmentary longitudinal vertical section on the line 8—8 of Fig. 5.
Figure 9:
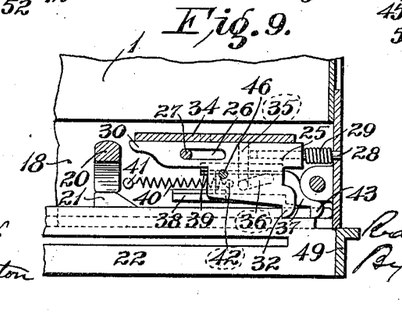
Fig. 9 is a fragmentary view showing the controlling members for the door-retaining lock moved into position to release the locking mechanism.

The hook 43 on the plate 37 is located in the path of a shoulder 44 which is provided on the side member 22 of the bag-frame. The two shoulders 33, 44, which constitute key-seats are provided by notching the side member 22 of the bag-frame and said shoulders are stepped; that is, the shoulder 44 is located ahead of the shoulder 33 and offset therefrom. By this arrangement, when the bag-frame is attached to the letter box, the shoulders 44 on the side members 22 first engage the hooks 43 on the sliding plates 37. The plates 37 are thereby moved rearwardly and the bolts 35 on the plates 25 are withdrawn from the notches in the flanges 34 owing to the inclination of the cam-slots 36 in the plates 37 in which the pins on said bolts 35 are fitted. After the plate 37 has been initially moved to withdraw the bolt 35 from the notch in the flange 34, the shoulder 33 on the side member 22 of the bag-frame engages the hooked portion 32 on the plate 25 and the two plates 25 and 37 are moved simultaneously rearward, the projection 30 on the plate 25 being withdrawn from above the shoulder 21 on the lever 20. The cam-projections 21 on the side members 22 of the bag-frame ride under the ends of the levers 20 as the projecting portions 30 of the plates 25 are being withdrawn from the above offsets or shoulders 31, and the lever members are thereby raised as shown by dotted lines in Fig. 7.

A leaf spring 45 is mounted on the inner face of the end member of the frame 17 and has a pin 46 on the free end thereof which projects through a hole in said end member of the frame 17. The tendency of this spring is to normally project the end of the pin 46 beyond the outer face of the end member of the frame 17 so as to enter a hole 47 provided in the sliding plate 25, when said plate has reached the limit of its rearward movement so that the controlling members are held in their rearmost position.

The controlling members are held in this position until the doors 3 and 4 are nearly closed. Lugs 48 are provided on the inner face of the door 3 near the end marginal portions thereof and the upper edges of said lugs are beveled or rounded off so that the lugs will enter between the spring 45 and the inner face of the end member of the frame 17 so as to force the spring inward and withdraw the pin 46 from the hole 47 in the plate 25. The spring 29 will then push the plate 25 forwardly into normal position and permit the spring 40 to retract the plate 37 and thereby push the bolt 35 into the notch in the flange 34.

The member 49 of the collecting-bag frame which connects the ends of the side members 22 is arranged so that its top edge is located below the top edge of said side members 22 so that it will pass underneath the box 1. The door 3 has on its outer face, near each end, cam projections 50. As the frame of the collecting-bag is withdrawn from the box the upper edge portion of the cross member 49 contacts with the inclined portions 51 of the cam projections 50 and forces the door 3 into closed position; and, as the cam projections 21 on the side members 22 of the frame are withdrawn from under the levers 20 said levers drop and thereby rock the members 15 back into normal position so that the hooked members 14 thereon are in position to engage the lugs or keepers 12 on the doors.

The doors, of course, are simultaneously closed due to the link connections hereinbefore described. To insure the doors being held closed until the hooks 14 engage the keepers 12, the cam projections 50 are continued to the meeting edge of the door 3 and projections 52 are provided on the outer face of the door 4 in line with said projections 50 on the door 3 and adjacent thereto so that the cross member 49 of the frame of the collecting bag will hold the doors closed for a considerable time during the withdrawal of the bag-frame. Springs 53 are secured to the rocking members 15 and arranged to bear against the end members of the frame 17 so as to yieldingly hold the rocking members and parts carried thereby in normal position.

An indicator-dial or wheel 54 is rotatably mounted on a stud 55 which projects inwardly from the front wall of the box 1. This dial comprises a body portion which is secured to a ratchet wheel 56. The ratchet wheel is located between the dial and the front wall of the box and its teeth 57 are engaged by a spring-pressed pawl or hook 58 which is mounted on a vertical reciprocatory bar 59. This bar is provided with a longitudinal slot 60 in its upper portion which coöperates with a headed stud 61 projecting from the inner face of the front wall of the box. The lower portion of the bar 59 is guided by a strap 62 which is secured to the inner side of the frame 17. A spring 63 is connected at one end to the bar 59 and at its opposite end to one of the securing screws for the guide strap 62 or a specially provided stud. The lower end of the bar 59 bears normally against the inner side of the door 4 when the door is closed and the pawl 58 normally engages the tooth 57 on the ratchet wheel 56 which lies on a horizontal line passing through the axis of the bearing stud 55. When the door is opened, the spring 63 will pull the bar 59 downwardly and the ratchet wheel 56 and dial 54 secured thereto will be rotated owing to the engagement of the pawl 58 with the tooth of the ratchet wheel.

Figure 12:
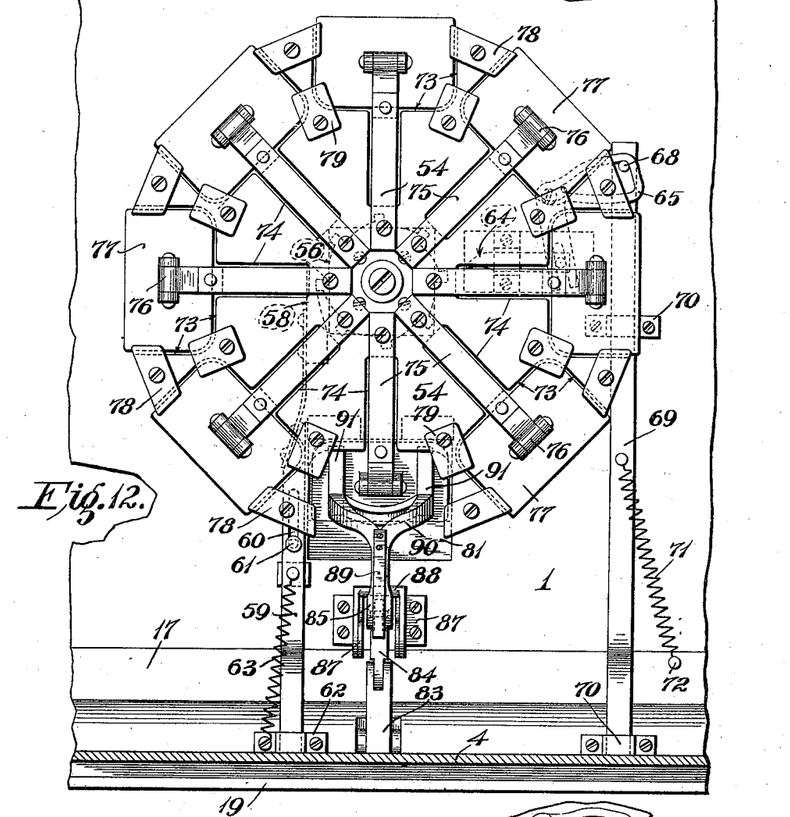
Fig. 12 is a section taken on the line 12—12 of Fig. 10.
Figure 13:
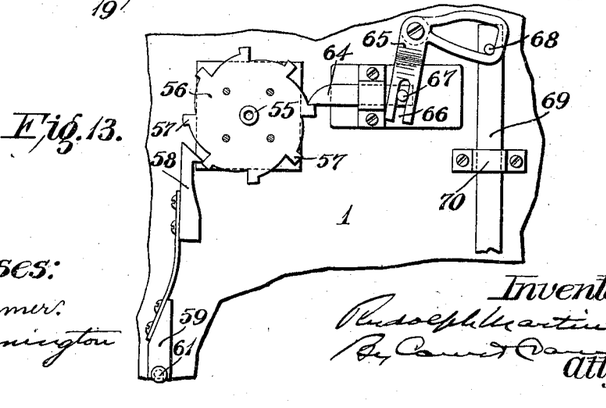
Fig. 13 is a fragmentary view showing the ratchet mechanism for the dial.
Figure 14:
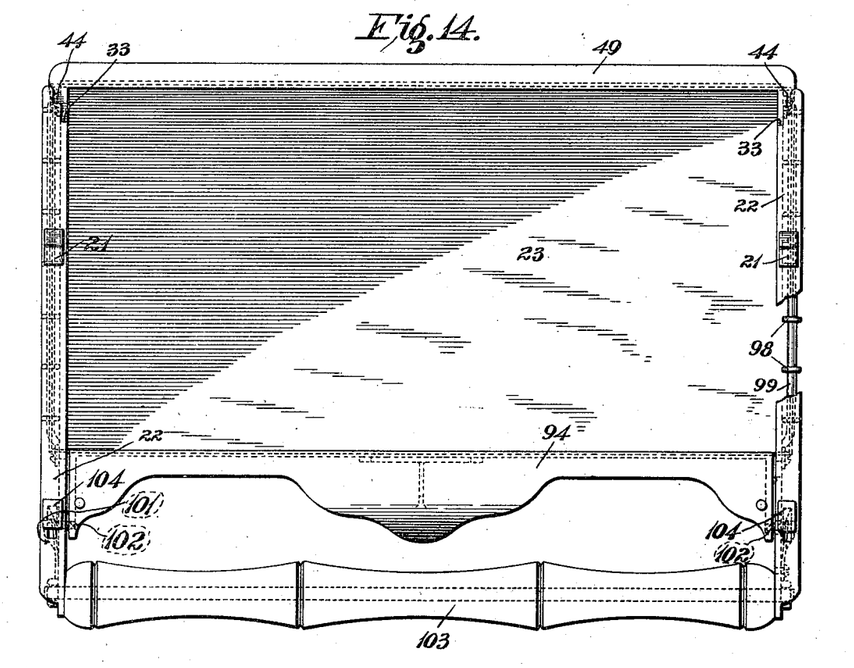
Fig. 14 is a top plan view of the collecting-bag.
Figure 15:
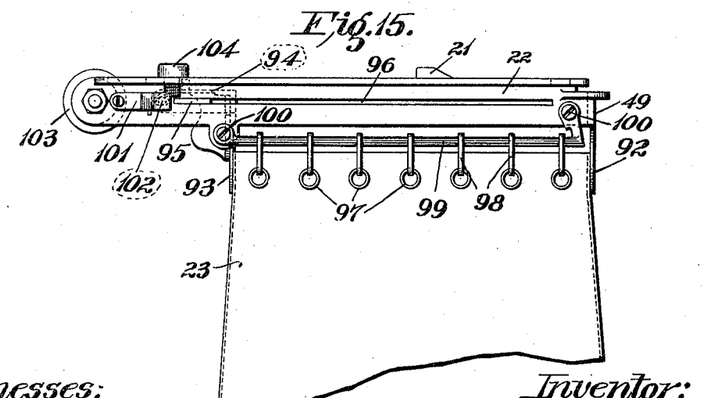
Fig. 15 is a side elevation of the collecting-bag.

To limit the movement of the ratchet wheel a sliding pawl 64 is mounted on the inner face of the front wall of the box 1 so as to be moved into the path of a tooth of the ratchet wheel 56 after the wheel has started to rotate and thereby limit its movement to the distance of one tooth or step. A bell crank 65 is pivotally mounted on the front wall of the box and one arm thereof is slotted or bifurcated as at 66 so as to coöperate with a stud 67 on the sliding pawl 64. The opposite arm of the bell crank is formed as a loop or has a slot therein in which a stud 68 on a vertical reciprocatory bar 69 works. This bar 69 is guided by two straps 70 which are secured respectively to the inner face of the front wall of the box and to the inner face of the side portion of the frame 17 and the lower end of said bar 69 bears normally against the inner side of the door 4 when the door is closed. A spring 71 is connected at one end to the bar 69 and at its opposite end to a stud 72 on the inner face of the front wall of the box or on the frame 17. When the door 4 is closed the stud 68 on the bar 69 bears against the top portion of the looped arm of the bell crank 65 and holds the same in position as shown in Fig. 12, whereby the pawl 64 is withdrawn from the ratchet wheel 56. When the bar 69 is pulled by the spring 71, as the door 4 is opened, the lost motion due to the width of the looped portion of the bell crank 65 will permit said bell crank to remain stationary until the bar 59 has been actuated to rotate the ratchet wheel 56. As soon as the pin 68 bears against the lower side of the looped arm of the bell crank, said bell crank is rocked to the position shown in Fig. 13 and the pawl 64 is moved into the path of the tooth on the ratchet wheel and the continued movement of the bar 59 will bring the tooth into contact with said pawl 64 and thereby arrest the movement of the ratchet wheel. The dial is thereby prevented from over-traveling by its momentum. The travel of the bar 59 is limited by the length of the slot 60, the upper end of the slot contacting with the stud 61 in the lowermost position of the bar.

The dial-wheel 54 is cut out at regular intervals throughout its peripheral portion as at 73 and communicating with each of the cut out portions is a radial slot 74, said radial slots extending inwardly for a considerable distance. Secured on the inner side of the dial-wheel 54 are a series of radially-disposed resilient tongues 75 which are of a width less than the width of the slots 74 so that said tongues may be moved through said slots. On the outer ends of these spring tongues are secured hinge members 76 on which are pivotally mounted plates 77, said plates being fitted loosely in the cut out marginal portions 73 of the wheel 54. The spring tongues 75 are set so that they normally tend to spring inwardly away from the inner side of the wheel. Clips 78, 79, are secured on the inner face of the wheel so that the edge portions thereof project over the side and bottom edges of the cut out portions 73 and serve as stops against which the plates 77 are held in retracted position by the spring tongues 75.

In the front wall of the box 1 is a sight opening 80. This opening is located medially below the axis of the dial wheel; and, for convenience, it is located in a raised or embossed portion 81 of the wall and at an incline substantially shown in Figs. 1, 2, 10, and 11. The resiliently-supported plates 77 have characters or symbols marked on their outer faces to indicate the periods of collection and said plates are adapted to be successively moved into position and pressed outwardly into coöperative relation with the sight opening. To secure a tight joint the plates 77 are provided on their outer faces with ribs 82 which project through the opening 80 and fit snugly against the edges thereof.

Figures 10, 11:
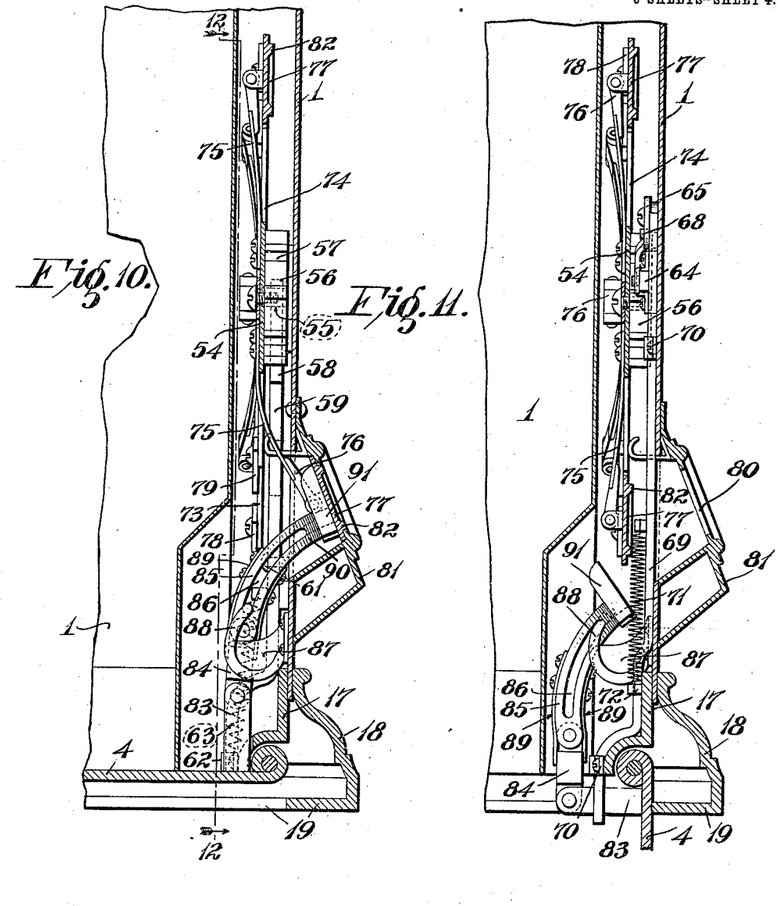
Fig. 10 is a transverse vertical section through the middle front portion of the box, showing the indicator mechanism, the door at the bottom of the box being closed.
Fig. 11 is a view similar to Fig. 10, the door at the bottom of the box being open.

A lug 83 is provided on the inner side of the door 4 and to it is pivoted one end of a link 84 whose opposite end is pivoted to a pusher member 85. The member 85 has a curved shank portion which has an arcuate slot 86 extending lengthwise thereof. A bracket 87 is mounted on the inner side of the front wall of the box 1 and has a cross bar 88 which is fitted through the slot 86 and serves to guide the member 85. The member 85 has a pair of springs 89 secured to opposite sides thereof and the free ends of these springs lap over the connecting link 84 so that the member 85 and link 84 are resiliently held in coöperative relation to each other. The upper end of the member 85 is forked and each branch 90 thereof has on its end a shoe 91 which is adapted to bear against the inner face of the lowermost plate 77 on the dial-wheel. When the door 4 is closed, the lug 83 thereon is moved to the position shown in Fig. 10; and, owing to the link connection between the member 85 and said projection 83 on the door and the arrangement of the guide bracket 87 and the slot 86 in the member 85, the shoes 91 are pressed against the plate 77 and the same is thereby held before the sight opening 80, as shown in Fig. 10. When the door 4 is swung open as shown in Fig. 11 the member 85 is retracted, whereupon the spring tongue 75 on which the plate 77 is mounted retracts the plate and the dial is then free to be rotated by the actuating mechanism hereinbefore described.

The collecting-bag 23 is secured at one side to a depending flange 92 on the frame member 49 and at its opposite side to a flange 93 on a movable cross member 94. This cross member 94 is provided at each end with a rib 95 which slidably fits in a groove or slot 96 in the side members 22 of the frame, so that the cross member 94 may be moved toward and away from the cross member 49. The two end portions of the bag are provided with a series of eyelets 97 through which are secured loops 98 which are strung on rods 99. The rods 99 are secured by screws 100 to the side members 22 of the frame. Springs 101 are mounted on the outer faces of the side members 22. These springs are provided with pins 102 which are projected through perforations in the side members 22 so as to engage in perforations in the ends of the movable cross member 94 whereby said member 94 may be held adjacent to the handle 103 which connects the ends of the side members 22. On the side members 22 are slidably mounted buttons 104 which have downwardly projecting stem portions 105 whose outer faces are beveled to engage the springs 101 when the buttons 104 are drawn toward the handle 103 and thereby press said springs outwardly to release the pins 102 from the movable cross member 94, so that said cross member is free to be moved over against the member 49 to close the bag.

Obviously, my device admits of considerable modification without departing from my invention. Therefore, I do not wish to be limited to the specific construction and arrangement shown.

What I claim as my invention and desire to secure by Letters Patent is:

1. The combination with a letter box which is arranged to have the frame of a collecting-bag attached thereto and having a pair of outwardly opening doors in its bottom, of a lock adapted to hold said doors normally closed, said lock comprising a horizontal rocking member having hooked members thereon which are adapted to engage keepers on the inner faces of said doors, a lever-arm on said rocking member, said lever-arm being arranged in the path of a cam-projection on said bag-frame whereby, when said bag-frame is attached to the letter box, said cam-projection thereon raises said lever-arm, and a controlling device for the lock, said controlling device comprising a reciprocatory member which is adapted to normally engage said lever-arm to prevent the actuation of the same, said controlling member having a projection adapted to engage a key-seat on said bag-frame, said key-seat being so located with respect to the cam-projection on the bag-frame that said controlling member is released from said lever-arm as the cam-projection passes thereunder.

2. The combination with a letter box which is arranged to have the frame of a collecting-bag attached thereto, said letter box having a pair of outwardly opening doors in its bottom, of a lock arranged to hold said doors normally closed, said lock comprising a rocking member having hooked portions which are adapted to engage keepers on the inner side of said doors, a lever-arm on said rocking member arranged in the path of a cam-projection on said bag-frame whereby, when said bag-frame is attached to the letter box, the cam-projection is moved under said lever-arm and thereby releases the hooked portions of the rocking member from the keepers on the inner side of the doors, a controlling device for said lock, said controlling device comprising a reciprocatory member which is adapted to normally engage said lever-arm, said controlling member having a projection arranged in the path of a key-seat on said bag-frame, a second controlling member coöperatively associated with said first mentioned controlling member and adapted to lock the same in its normal position, said second controlling member having a projection in the path of a key-seat on said bag-frame, said key-seats being so arranged with respect to each other and to said cam-projection on said bag-frame that said controlling members are actuated to release said lever-arm as the cam-projection passes thereunder.

3. The combination with a letter box which is arranged to have a frame of a collecting-bag attached thereto, said letter box having a pair of outwardly opening doors in its bottom, said doors being operatively connected so as to move simultaneously and having a spring arranged so as to exert its force to open said doors, of a lock adapted to hold said doors normally closed, said lock comprising a rocking member having hooked portions which are adapted to engage keepers on said doors, a lever-arm on said rocking member arranged in the path of a cam-projection on said bag-frame whereby it is raised and the hooked portions of the rocking member are released from the keepers on the doors when the bag-frame is attached to said letter box, and a cam-projection on the outer face of one of said doors, said cam-projection being arranged so as to coöperate with said bag-frame as the same is detached from the letter box, whereby said doors are closed.

4. The combination with a letter box which is arranged to have the frame of a collecting-bag attached thereto, the bottom of said letter box comprising an outwardly opening door, of a lock adapted to hold said door normally closed, said lock comprising a rocking member having a hooked portion which is arranged to engage a keeper on the inner side of said door, a lever-arm on said rocking member arranged so that its end lies in the path of a cam-projection on the bag-frame, whereby said rocking member is rocked and the hooked member is released from said keeper as the bag-frame is attached to the letter box, a controlling device for said lock comprising a reciprocatory member which is adapted to normally engage said lever-arm and hold the same against actuation, a projection on said reciprocatory member arranged in the path of a key-seat on the bag-frame, a second reciprocatory member located in coöperative relation to said first mentioned reciprocatory member and adapted to normally lock the same in normal position, a projection on said second reciprocatory member arranged in the path of a key-seat on said bag-frame, said key-seats being so arranged with respect to each other and to the cam-projection which coöperates with said lever-arm, that said second reciprocatory controlling member is initially moved to release said first controlling member and thereby release the same from said lever-arm as the cam-projection passes thereunder, and resilient means for restoring all of said parts as the bag-frame is removed from the letter box.

5. The combination with a letter box which is arranged to have the frame of a collecting-bag attached thereto, the bottom of said letter box comprising an outwardly opening door, of a lock adapted to hold said door normally closed, said lock comprising a rocking member having a hooked portion which is adapted to engage a keeper on the inner side of said door, a lever-arm on said rocking member arranged so that its end lies in the path of a cam-projection on said bag-frame, and a locking device for said lever-arm comprising a reciprocatory plate having a projection which is adapted to normally engage said lever-arm and lock the same in normal position, a second reciprocatory plate arranged alongside of said first mentioned plate and coöperating with a latch member thereon to normally lock said first mentioned plate in normal position, said reciprocatory plates each having projections thereon which are arranged so as to engage key-seats on said bag-frame, said key-seats being so located with respect to each other and to the cam-projection which coöperates with said lever-arm that said second locking plate is initially moved to release said first mentioned locking plate and then to move said two plates simultaneously to release the first mentioned plate from said lever-arm as the cam-projection passes thereunder, resilient means for restoring all of said locking elements to normal position, a spring catch arranged to engage the first mentioned locking plate after the same has been actuated to release the lever-arm, and means on the inner side of said door for releasing said spring catch as the door is closed.

Signed at St. Louis, Mo., this 12th day of January, 1910.

RUDOLPH MARTINI.

Witnesses:
G. A. PENNINGTON,
J. B. MEGOWN.